Jan. 18, 1949.　　　　　F. K. VAN ALMELO　　　　　2,459,475
DIFFERENTIAL PRESSURE FLUID SERVOMOTOR

Filed Dec. 2, 1943　　　　　　　　　　　　　　　4 Sheets-Sheet 1

INVENTOR
Fred K. Van Almelo
BY
ATTORNEY

Jan. 18, 1949.  F. K. VAN ALMELO  2,459,475
DIFFERENTIAL PRESSURE FLUID SERVOMOTOR
Filed Dec. 2, 1943  4 Sheets-Sheet 2

INVENTOR
Fred K. Van Almelo
BY
ATTORNEY

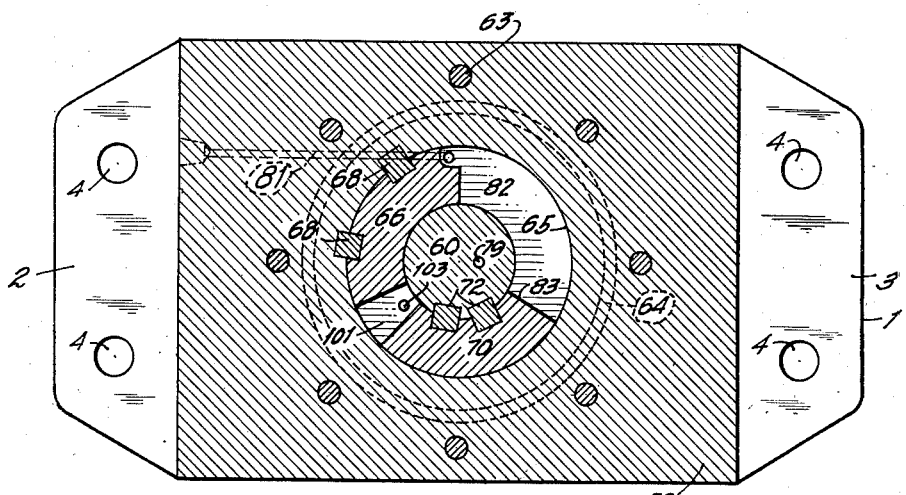

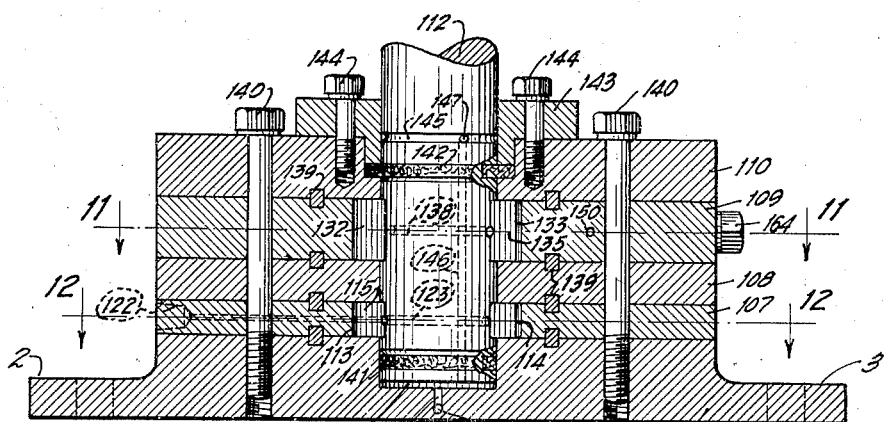
FIG. 10
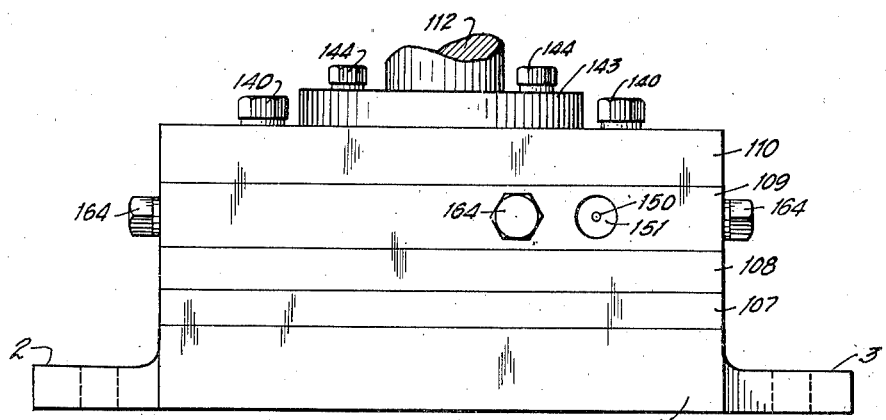
FIG. 9
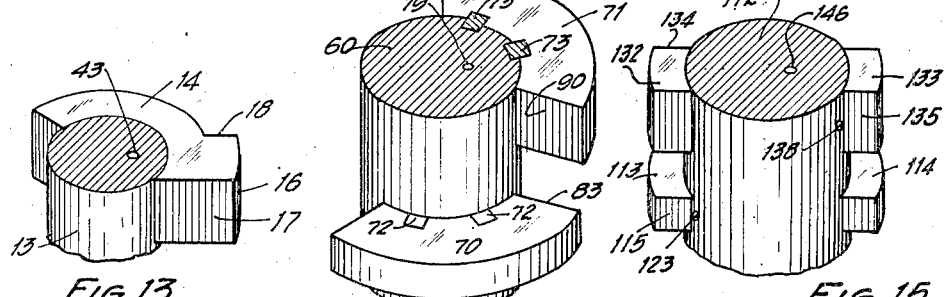
FIG. 13   FIG. 14   FIG. 15
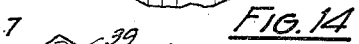
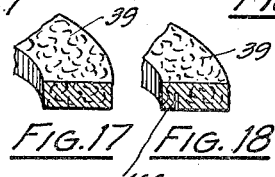
FIG. 16   FIG. 17   FIG. 18
INVENTOR
Fred K. Van Almelo
ATTORNEY Patented Jan. 18, 1949

2,459,475

UNITED STATES PATENT OFFICE 2,459,475

DIFFERENTIAL PRESSURE FLUID SERVOMOTOR

Fred K. van Almelo, Nassau, N. Y.

Application December 2, 1943, Serial No. 512,657

2 Claims. (Cl. 121—44)

My invention relates to fluid actuated closure operators and particularly to hydraulically actuated operators for opening and closing the doors of passenger carrying vehicles such as cars, buses and the like.

For many years the brakes on commercial passenger carrying vehicles have been actuated by compressed air and, probably, because a supply of compressed air is required for the operation thereof, the door operators, likewise, have been operated by compressed air from the same source. Air brakes and door operators of the air actuated type are designed to operate at comparatively low pressures, say around one hundred pounds per square inch, and, because considerable power must be developed, have necessarily been comparatively large.

With the increasing use of hydraulic brakes which require a source of supply of liquid, usually oil, under high pressure, or upon which high pressure can be immediately developed as and when necessary, it has become desirable to provide an hydraulically operated door operator which may draw its power from the same source as the hydraulically actuated brakes, and thus avoid the necessity of providing both a source of compressed air and a source of liquid under high pressure. Furthermore, it is desirable, in many instances, to provide interlocking safety devices which prevent the doors of the passenger vehicle from being opened when the vehicle is in motion with the brakes off and the problem is considerably simplified where both the doors and brakes are actuated by the same medium. By utilizing high pressure, say of the order of one to two thousand pounds per square inch, a great deal of power can be generated by comparatively small mechanisms with parts moving through comparatively short distances, and thus, the size of the closure operators may be substantially reduced. Furthermore liquid under high pressure is, generally speaking, not dangerous, whereas, containers of air under high pressure may burst with explosive violence and cause serious damage.

However, due to the high pressures contemplated for use in hydraulic operators the present designs of air actuated operators are not well adapted for hydraulic operation because of the special problems encountered in the change over involving leakages of liquid under such high pressures. Aside from the fact that leakages result in substantial loss of pressure, efficiency and positiveness of operation, they are particularly objectionable in door operators employing oil as an operating medium since such devices are ordinarily positioned over the doors operated thereby and through which passengers enter and leave the vehicle.

The general object of my invention is to provide an hydraulically actuated closure operator of simple, compact design without the use of reciprocating parts, such as pistons, plungers and the like together with cranks or other linkages which are necessary to transform straight line motion into motion of rotation. Another object is to provide such a device which will withstand high liquid pressures and in which any leakage of liquid from the high pressure to the low pressure side of those parts which are directly moved by liquid pressure is returned directly to the source of supply of the liquid. Another object is to provide an hydraulically actuated closure operator of the differential pressure type in which rotative movement is imparted to a shaft or rotor directly by liquid pressure, and in which all the motor parts rotate or oscillate rather than reciprocate. A further object is to provide a device of this character in which the rate of door opening and closing may be regulated, and in which the rate of opening or closing, particularly as the end of the opening or closing portion of the cycle is approached, may be reduced to a desired degree to prevent slamming.

With these objects in view, my invention includes the novel elements and the combinations and arrangements thereof described below and illustrated in the accompanying drawings in which—

Fig. 8 is a section of the device in the plane 8—8 of Fig. 6;

Fig. 9 is a side elevation of a third species of operator;

Fig. 10 is a vertical section of the third species of operator taken in a plane passing through the center of the shaft with certain portions broken away; the shaft or rotor and its associated parts being shown in elevation;

Fig. 11 is a section of the device in the plane 11—11 of Fig. 10;

Fig. 12 is a fragmentary section of the device in the plane 12—12 of Fig. 10;

Fig. 13 is a fragmentary perspective view of the shaft or rotor in the device shown in Figs. 2, 3 and 4;

Fig. 14 is a fragmentary perspective view of the shaft or rotor in the species shown in Figs. 5, 6, 7 and 8;

Fig. 15 is a fragmentary perspective view of the shaft or rotor in the species shown in Figs. 9, 10, 11 and 12;

Fig. 16 is an enlarged fragmentary vertical section of the device showing a portion of the shaft, the packing and the packing gland; and Figs. 17 and 18 are enlarged fragmentary perspective views illustrating types of packing which may be employed about the shaft.

Figure 4:
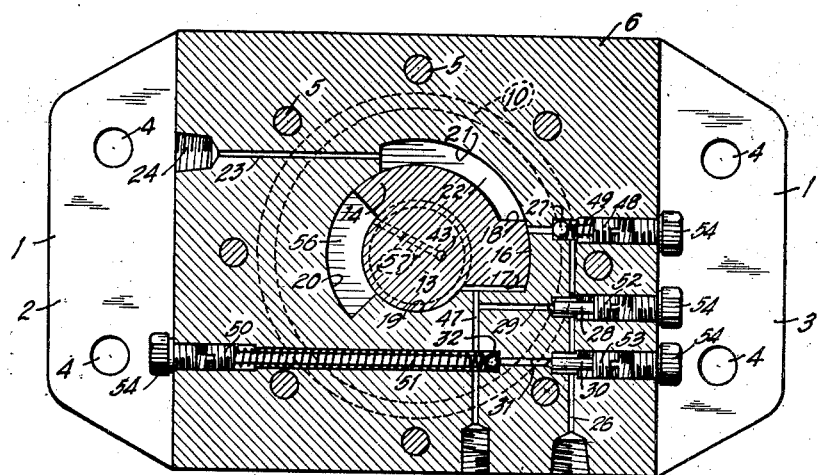
Fig. 4 is a horizontal section of the device in the plane 4—4 of Fig. 3.
Figure 3:
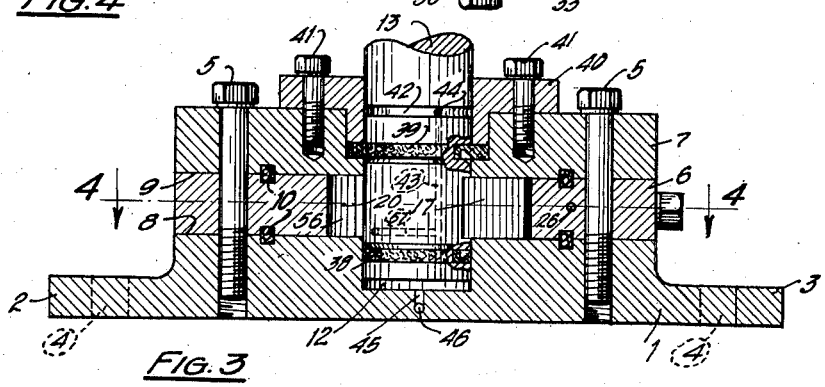
Fig. 3 is a vertical section lengthwise of the device and taken in a plane passing through the center of the shaft; the rotor and its associated parts being shown in elevation with portions broken away.
Figure 2:
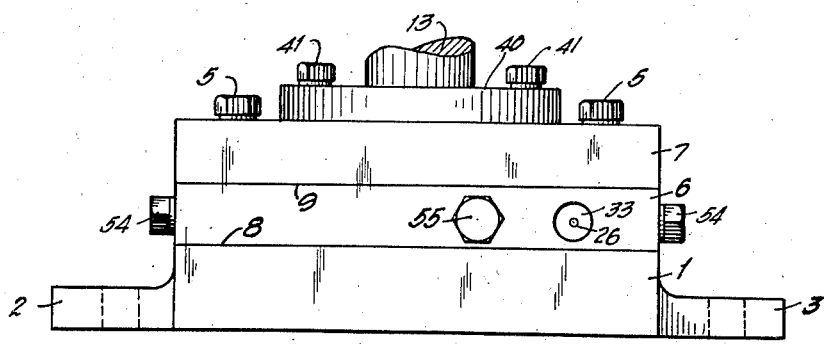
Fig. 2 is a side elevation view of one species of operator.

Referring first to Figs. 2, 3 and 4, my operator comprises a body, preferably but not necessarily of laminated construction, comprising a base 1 provided with flanges 2 and 3 having holes 4 therein for the reception of bolts or screws for securing the device to a suitable foundation. Secured to the base 1 by means of cap screws 5 are two plate or block-like laminae 6 and 7. The top surface 8 of the base 1, the bottom surface 9 of the lamina 7, and both the top and bottom surfaces of the lamina 6, are ground so that contact as nearly perfect as possible between these surfaces is attained. In addition, packing rings 10 are interposed between the base and lamina 6 and also between laminae 6 and 7.

The base is provided with a centrally disposed cylindrical depression 12, the side wall of which forms a bearing for the lower end of the shaft or rotor 13. Preferably integral with the shaft 13 (see Fig. 13) is the outwardly extending portion 14, the top and bottom surfaces of which are ground and are parallel and spaced apart a distance substantially equal to but just sufficiently less than the thickness of the lamina 6 to provide a running fit with the top of the base 1 and the bottom of the lamina 7. The periphery of the outwardly extending portion 14 is a fragmentary portion of a cylinder coaxial with the shaft 13.

The periphery of another outwardly extending portion 16 is a fragmentary portion of a larger cylinder also coaxial with the shaft 13 and is limited in extent by the parallel planes 17 and 18 which form vanes or pressure surfaces. The opening in the central portion of the lamina 6 is shaped, as best shown in Fig. 4, to provide vertically extending cylindrical surfaces 19, adapted to form a bearing for the shaft 13, 20 to form a bearing for the cylindrical periphery of the portion 14, and 21 adapted to form a bearing for the cylindrical portion 16, of the rotor. It is to be understood that these cooperating bearing surfaces are ground and lapped to as small clearances as possible and yet provide a running fit between them. The angular extent of the surfaces 19, 20 and 21 are such that the shaft 13 and its associated parts may oscillate through an angle of appropriate magnitude to effect the desired movement of the closure.

In the position of the parts shown in Fig. 4, the shaft 13 is illustrated as at the limit of its clockwise movement. This, ordinarily, is the position of the parts when the door is fully open.

Figure 1:
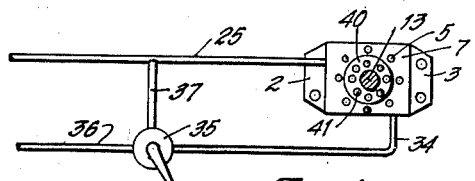
Fig. 1 is a small scale diagrammatic plan view of my operator shown in connection with an operating valve and a fragmentary portion of the pipes leading therefrom.

In communication at all times with that portion of the space 22 which is defined in part by the surface of vane 18 is the passage 23 which is enlarged and internally pipe threaded at the outer end 24. Communicating with this passage is a pipe 25 (see Fig. 1) which is always in communication with the source of liquid under pressure in an accumulator (not shown). A passage 26 in lamina 6 also communicates with that portion of the space 22 in block 6 which is defined in part by the surface of vane 17; communication being effected through ball check valve 27, when open, needle valve 28 and passage 29, and also through needle 30, passage 31, check valve 32, when open, and passage 47. Passage 26 is enlarged and threaded at its outer end 33 for the reception of pipe 34 (see Fig. 1) which communicates with valve 35. A pipe 36 provides communication between valve 35 and the sump of the accumulator (not shown), and the pipe 37 provides communication between valve 35 and pipe 25. The valve 35 is a two-way valve which in one position provides communication between pipes 34 and 37 and in the other position provides communication between pipes 34 and 36.

In order to reduce leakage along the shaft from the pressure chamber 22 in lamina 6, the shaft 13 is provided with a packing 38 below the pressure chamber and a packing 39 above the pressure chamber; the packing 39 being compressed by means of the gland 40 and the cap screws 41.

To prevent seepage to the outside of the body of such liquid as may get past the packing 39, the shaft, above the packing, is provided with a circumferential groove 42 which communicates with a passage 43, drilled upwardly from the bottom of the shaft, through the cross passage 44 (shown in end view in Fig. 3). Liquid passing downwardly through the passage 43, and also such liquid as may seep past the packing 38, collects below the bottom of the shaft in the recess 12 in the base block 1 and from there is drained back to the sump of the accumulator through passages 45 and 46. Details of the packings will be hereinafter described.

In operation, it is to be remembered that liquid pressure is always exerted on surface 18 of the rotor because the space 22 is always in communication with high pressure liquid in the accumulator. In the position of the parts shown in Fig. 4, the valve 35 is understood to be in that position in which communication between pipes 34 and 36 is effected and communication between pipe 37 and the valve is cut off.

In order to effect counter-clockwise rotation of the shaft or rotor to close the doors, valve 35 is turned so that communication between pipes 34 and 36 is cut off and communication is established between pipes 34 and 37. Thus, passage 26 will be placed in communication with liquid at the accumulator pressure.

It will be noted that the surface area of vane 17 is substantially greater than the area of vane 18 (because of a greater width with the same height or depth), and the radial distances of the center of gravity of vanes 17 and 18 from the axis of shaft 13 are so correlated that the product of the area of vane 17 multiplied by the radial distance of its center of gravity from the axis of shaft 13 is substantially greater than the area of vane 18 multiplied by the distance of its center of gravity from said axis. Thus, with the same unit pressure on both vanes a substantially greater turning moment will be exerted on shaft 13 by vane 17 and the shaft will turn in a counter-clockwise direction. The liquid under accumulator pressure in passage 26 will flow through needle valve 30 and passage 31 forcing ball check valve 32 away from its seat, and thence flow into the passage 47. The liquid will also flow through needle valve 28 and passage 29 into passage 47. Thus, liquid pressure on the surface 17 will move the rotor in a counter-clockwise direction until the door is closed and surface 18 has reached the limit of its counter-clockwise travel; the liquid in passage 23 being forced back towards the accumulator. When liquid under pressure is in passage 26 ball check valve 27, of course, will be held in closed position.

To open the door, the valve 35 is merely turned to the position where communication between pipes 34 and 36 is established and communication between pipes 34 and 37 is cut off. In this position of valve 35, passage 26 is in communication with the sump of the accumulator and pressure on vane 17 is relieved. As soon as the pressure is relieved on vane 17, the pressure which is constantly on vane 18 will turn the rotor in a clockwise direction. The liquid in contact with the vane 17 will be forced out of chamber 22 during the early part of the rotor travel both through check valve 27 and passages 47 and 29, and needle valve 28. As the surface 16 of the rotor moves clockwise across the passage communicating with check valve 27 the flow of liquid through this check valve will be cut off and, thereafter, discharge can only be effected through passages 47 and 29 and needle valve 28. Because the total effective area of the discharge passages is now substantially reduced the rate of clockwise movement of the rotor will be substantially reduced and the opening movement of the door will be retarded so that it does not slam open.

The rate of discharge of liquid from space 22 through the ball check valve 27 may be regulated by turning the adjusting screw 48 which regulates the distance which the ball may move from its seat. Similarly, the rate of flow of liquid through check valve 32 may be regulated by turning adjusting screw 50 which controls the distance which the ball may move from its seat. The flow through the needle valves 28 and 30 can be regulated by turning the adjusting screws 52 and 53, respectively. Thus, the rate of opening and closing movement and the degree of retardation may be regulated through wide ranges.

All the passages in which the aforesaid adjusting screws are located are closed by plug screws 54, all of which may be alike, and similar to plug screw 55 which serves to seal the opening in block 6 after passage 47 has been drilled from the outside.

In order to drain any liquid which may leak into the space 56 and also to prevent the formation of a partial vacuum therein, a passage 57 may be drilled into shaft 13 to communicate with passage 43.

In Figs. 5, 6, 7 and 8 I have illustrated a modification of my invention. Here, instead of having the vanes which are exposed to the liquid pressure integral with the shaft or rotor 13 and positioned wholly within one of the laminae which go to make up the body of my operator, those portions of the rotor which form the vanes are separate elements which are keyed to the rotor and disposed in different laminae. Thus, in this species, there is a base 1 which may be substantially identical with that in the species first described. On top of the base 1 is a block or lamina 58 within which that portion of the rotor carrying the vane of smaller surface area is enclosed. On top of the lamina 58 is a spacer plate or lamina 59 merely having a hole in the center thereof through which passes the shaft 60. On top of the lamina 59 is a plate or lamina 61 which is substantially thicker than the lamina 58 and within which is positioned that portion of the rotor having the vane of greater surface area. On top of the lamina 61 is a cap 62, and all of the laminae are secured together by means of cap screws 63. It is to be understood that the contacting surfaces of the base, cap and intermediate laminae are ground surfaces, and that packing rings 64 are interposed between each two of these contacting elements. In the relative positions shown in Figs. 6, 7 and 8 the rotor parts are substantially in door-open position.

The laminae 58 and 61 are each formed with a central, circular passage 65 therethrough and, within the limits of laminae 58 and laminae 61, respectively, annular blocks 66 and 67 of a circumferential length sufficient to permit the required oscillating movement of the rotor are secured by means of keys 68 and 69, respectively. Similar annular blocks (see also Fig. 14) 70 and 71 are secured to the shaft 13 by means of keys 72 and 73 respectively. It is to be understood that all these blocks are ground to fit closely the surfaces with which they run in contact, and also to fit the surfaces to which they are keyed to prevent or reduce leakage therebetween.

To prevent seepage of liquid from the pressure chambers along the shaft, a packing ring 74 surrounds the shaft within the base 1, and a packing ring 75 is fitted within a groove in the shaft above lamina 61. This last mentioned ring is of larger diameter than the shaft so that it may be engaged and compressed by gland 76 which is secured to the cap plate 62 by means of the cap screws 77. A groove 78 is also provided in the shaft 60 above the packing ring 75 and communicates with a vertical drain 79, drilled upwardly from the bottom of the shaft, through the cross-drain 80 which is shown in end elevation in Fig. 6.

It will be noted that the passages through laminae 58 and 61 in the species shown in Figs. 5, 6, 7 and 8 are cylindrical, and therefore can be readily formed by a straight drilling or boring operation. However, in its operation, and in the means for controlling the rate thereof, it does not differ materially in construction or operation from the species shown in Figs. 2, 3 and 4. Thus, a passage 81 (see Fig. 8) which communicates with the pressure chamber or space 82 is always in communication with the liquid under pressure in the accumulator and hence pressure is always exerted against the vane surface 83 of the rotor and tends to move the shaft 60 in a clockwise direction or to hold it at the limit of its movement in this direction. This, ordinarily, is the door-open position. In order to turn the rotor in a counter-clockwise direction to close the doors, valve 35 (see Fig. 1) is moved to the position where pipes 34 and 37 are placed in communication. This admits liquid under accumulator pressure through pipe 34 into passage 84 which is enlarged and pipe-threaded at its outer end 85 to receive pipe 34. By referring particularly to Fig. 7, it will be noted that fluid under accumulator pressure in passage 84 may flow into the space 85 through the needle valve 86, ball check valve 94 and passage 87, and also through needle valve 88 and passage 89. Because the area of the vane surface 90 is greater than the area of the vane surface 83, due to the difference in the thickness of laminae 58 and 61, although the radial distances of the center of gravity of each vane surface from the axis of shaft 60 are the same, liquid pressure in space 85 acting on the surface of vane 90 will turn the rotor in a counter-clockwise direction. During this portion of the cycle liquid in chamber 82 will be forced back through passage 81 and the ball check valve 91 will be held closed by the fluid pressure in passage 84 and also by the ball seating spring 92.

Figure 7:
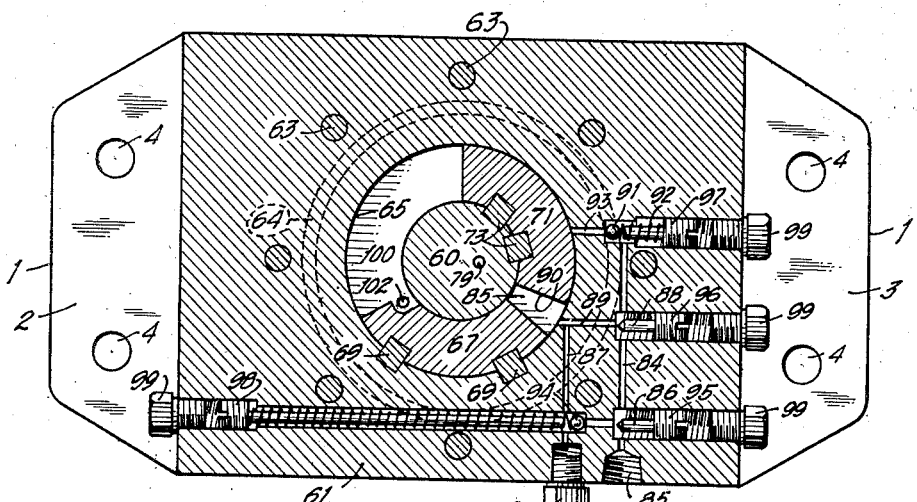
Fig. 7 is a section of the device in the plane 7—7 of Fig. 6.
Figure 6:
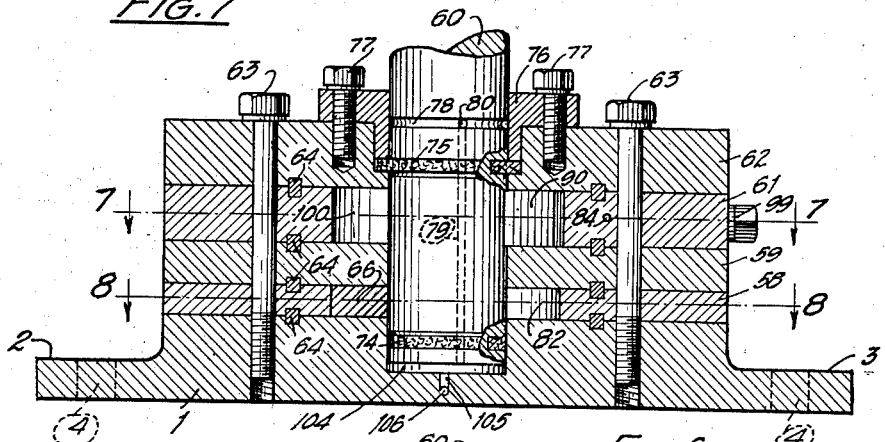
Fig. 6 is a vertical section thereof similar to that shown in Fig. 3 and taken in a plane passing through the center of the shaft; the shaft or rotor and its associated parts being shown in elevation with portions broken away.
Figure 5:
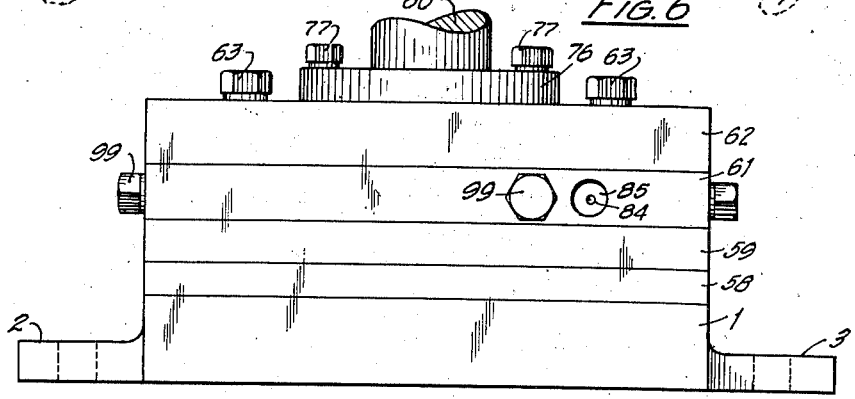
Fig. 5 is a side elevation view of another species of the operator.

To open the doors or to return the rotor to the position shown in Figs. 7 and 8, it is merely necessary to turn valve 35 to the position where communication is provided between pipes 34 and 36 and communication between pipes 34 and 37 is cut off.

With valve 35 in this position passage 84 is placed in communication with the sump and pressure in this passage and in the other spaces and passages communicating therewith is relieved. This being so, the liquid under accumulator pressure on the surface of vane 83 will now turn the rotor in a clockwise direction and force the liquid out of the space 85. In the first instance this liquid may flow into passage 84 both through the passage 89 and needle valve 88, and also through passage 93 and ball check valve 91 which is unseated by the pressure of the liquid being discharged from space 85. When a portion 71 of the rotor moves past the point where passage 93 communicates with space 85 the discharge of liquid through the ball check valve 91 stops and, thereafter, discharge takes place only through passage 89 and needle valve 88. Because the rate of liquid discharge from space 85 is substantially cut down the rate of movement of the rotor is correspondingly slowed and the doors do not slam open. The rate of passage of liquid through the needle valves can be regulated by adjusting the screws 95 and 96 and the rate of flow through the ball check valves 91 and 94 can be regulated by adjusting screws 97 and 98 respectively. Thus, the rate of opening and closing movement of the doors can be adjusted to meet a wide range of conditions.

The holes which are drilled for the needle valves, the ball check valves and passage 87 are sealed on the outer ends by plugs 99 all of which may be alike.

To prevent the establishment of a partial vacuum, or high pressure due to an accumulation of liquid in spaces 100 and 101, drains 102 and 103, respectively, communicating with the sump are provided, but passages, similar to passage 57 (see Figs. 3 and 4) communicating with passage 79, may be drilled in shaft 60.

Liquid accumulating in the base block in the space 104 at the bottom of the shaft can pass to the sump through the passages 105 and 106.

Referring to Figs. 9, 10, 11 and 12 and also to Fig. 15 I have here shown a further modification of my invention in which the rotor is provided with two vanes or pressure surfaces of comparatively small area, one on each side of its axis of rotation, and two vanes or pressure surfaces of comparatively large area, one on each side of said axis. The portion of the rotor carrying these surfaces may be very conveniently made integral with the shaft. Thus, in the species here illustrated, balanced pressures exist on opposite sides of the shaft at all times, and hence side thrust on the shaft, which may be quite high with the pressures employed is entirely eliminated.

Here, there are four laminae or plates 107, 108, 109 and 110 superimposed on the base 1. The base 1 is provided with the flanges 2 and 3 having holes therein for the reception of securing bolts and is also provided with a centrally disposed cylindrical recess 111, the side walls of which form a bearing for the lower end of the shaft 112. Within the confines of lamina 107 there projects from opposite sides of the shaft 112 two vanes 113 and 114 having pressure surfaces 115 and 116 respectively. The lamina 107 is provided with a centrally disposed cylindrical bore 117 into which project two integral portions 118 and 119 which bear against the shaft 112. The lamina 107 is also provided with a passage 120 which communicates with chamber 121 between the shaft and the bore 117 in lamina 107. The passage 120 is enlarged and internally threaded at its outer end 122 to receive the pipe 25 (see Fig. 1). The shaft 112 is also provided with a transverse passage 123 which provides communication between the chamber 121 and the chamber 124. Thus liquid pressure always exists in chambers 121 and 124 and, acting on the pressure surfaces 116 and 115 of the vanes tends always to rotate the shaft 112 in a clockwise direction or to hold it at the limit of its clockwise movement. To prevent a vacuum or the building up of fluid pressure on the opposite sides of the vanes, drains 125 and 126 are provided which may communicate with the sump of the accumulator, or passages, similar to passage 57 (see Figs. 3 and 4), might be drilled in shaft 112 to provide communication with drain passage 146 in the shaft. It is to be understood that the peripheries of the vanes 113 and 114 and the inside of the bore 117 have a close running fit as do the shaft 112 and the inside of the projections 118 and 119. Likewise the tops and bottoms of the vanes 113 and 114 have a close running fit with the bottom of lamina 108 and the top of the base 1, respectively.

Lamina 108 is merely a filler having a central opening therein for shaft 112 but the next above lamina 109 is substantially thicker than lamina 107 and is provided with a centrally disposed cylindrical bore 127 of the same size as bore 117 in lamina 107. Lamina 109 is also provided with integral portions 128 and 129 similar to portions 119 and 118, respectively, in lamina 107 and in vertical alignment therewith which bear closely against shaft 112. Thus chambers 130 and 131 are formed between the shaft and bore 127. Within the zone of lamina 109 the shaft is provided with oppositely disposed vanes 132 and 133 having pressure surfaces 134 and 135. In the position of the rotor shown in Fig. 11 spaces 136 and 137 (really portions of chambers 130 and 131) exist between the pressure surfaces 134 and 135 and the adjacent projections 128 and 129 and the shaft is provided with a transverse passage 138 providing communication between the spaces 136 and 137. All of the laminae are firmly secured together with packing rings 139 therebetween by means of the cap screws 140. It is to be understood, of course, that the peripheries and the tops and bottoms of the vanes 132 and 133 have close running fits with the surfaces which they contact. To prevent leakage downwardly along the shaft a packing ring 141 (see Fig. 10) is positioned in a groove in the shaft within the base 1. To prevent leakage upwardly along the shaft a second packing ring 142 is positioned in a groove in the shaft within lamina 110. This last mentioned packing ring is of larger diameter than the shaft so that it is engaged by the gland 143 and compressed thereby as the cap screws 144 are tightened. To intercept liquid seeping past the packing 142 and to prevent it from reaching the outside of the body, the shaft 112, in a zone above the packing 142, is provided with an annular groove 145 which communicates with the drain passage 146, drilled upwardly from the bottom of the shaft, through cross-drain 147 which is shown in end view in Fig. 10. Liquid draining through the vertical passage 146 is received in the recess 111 in the base 1 at the bottom of the shaft and may flow from there to the sump of the accumulator through passages 148 and 149.

Referring more particularly to Figs. 11 and 12, it will be apparent that liquid under pressure from the accumulator is always present in passage 120 which communicates with pipe 25 (see Fig. 1), and that liquid pressure in chamber 121, and 124 which communicates with 121 through the passage 123, will always tend to turn the rotor in a clockwise direction or to hold it at the limit of its movement in this direction.

In order to move the rotor in a clockwise direction, which is ordinarily the door closing movement thereof, it is merely necessary to turn valve 35 (see Fig. 1) so that communication between pipes 34 and 36 is cut off and communication between pipes 34 and 37 is established. In this position, liquid at accumulator pressure may flow into pipe 34 which communicates with passage 150 (see Fig. 11) in lamina 109. The liquid, at accumulator pressure, in passage 150 may flow into chamber 137 through needle valve 152 and ball check valve 153 and also through needle valve 154 and passage 155. From chamber 137 the liquid may flow through the transverse passage 138 in the rotor into the chamber 136. Fluid pressure built up in chambers 136 and 137 will act on vane surfaces 134 and 135 and, since these vane surfaces are larger than the vane surfaces 115 and 116 and their centers of gravity are at the same distance from the axis of rotation as the centers of gravity of the surfaces 115 and 116, pressure on the vane surfaces 134 and 135 will function as a force couple and exert a turning moment on the rotor which is substantially in excess of the turning moment exerted by the force couple created by the pressure on surfaces 115 and 116 but in the opposite or counter-clockwise direction. Thus the rotor will be turned in a counter-clockwise direction and the doors will be closed.

In order to open the doors it is only necessary to move valve 35 to the position where communication between pipes 34 and 37 is cut off and communication between pipes 34 and 36 is established. In this position passage 150 is placed in communication with the sump of the accumulator and the pressure therein and also in chambers 136 and 137 is relieved. The pressure which is constantly on vane surfaces 115 and 116 will then move the rotor in a clockwise direction and force the liquid from chamber 136 through passage 138 into chamber 137 and thence outwardly through passage 155 and needle valve 154 into passage 150, and also through passage 156 and ball check valve 157 into passage 150. During this phase of the movement, check valve 153 will be held seated and check valve 157 will be forced open. However, as the rotor 112 moves in a clockwise direction it will, as it approaches the limit of its movement in this direction, reach the point where communication between chamber 137 and passage 156 is cut off by the passage of the rotor across the entrance of passage 156 to chamber 137. When this occurs the effective cross-sectional area of the discharge passages leading from chambers 136 and 137 is substantially reduced because, thereafter, liquid can escape only through passage 155 and needle valve 154 into passage 150. The effect of this is to retard the clockwise movement of the rotor so that doors operated thereby will not slam open.

The rates of the opening and closing movements of the rotor may be regulated through a wide range of conditions by adjusting the needle valves and the ball check valves. Thus, the distance which ball check valve 157 can move from its seat may be varied by means of adjusting screw 161 to regulate the rate of liquid discharge from chambers 136 and 137; and the rate of liquid inflow into these chambers through ball check valve 153 can be similarly regulated by means of adjusting screw 162. Needle valve 152 may be adjusted by turning screw 159, and needle valve 154 may be adjusted by turning screw 160. The outer ends of the passages within which these adjusting screws are positioned are sealed by plug screws 164 all of which may be alike.

From the foregoing it will be apparent that I have provided a comparatively simple closure operator in which rotative movement of the shaft is produced directly by liquid pressure exerted on vanes attached thereto. Thus, there are no reciprocating elements involved and all linkages such as cranks, racks and pinions, etc., which are necessary to transform reciprocating motion to rotary motion are eliminated. The principle on which the device operates affords a great deal of latitude in the manner of detailed design since the turning moment exerted on the shaft by any vane depends both upon the surface area of the vane and also upon the distance of its center of gravity from the axis of rotation. Thus, since the pressure per unit of area on all vanes is the same, many combinations of vane size and lever arm may be employed to suit the designer. The vanes may be of the same area and different distances from the axis of rotation or of different size and the same distance from the axis of rotation. By either arrangement the necessary differential in turning moment may be attained.

In Figs. 16, 17 and 18, I have shown sections of the packing used to prevent or reduce seepage of liquid upwardly from the pressure chambers and along the shaft. Since the packings above the pressure chambers are alike in all the species I shall describe only that shown in Fig. 3. Thus, 7 is the lamina in which the packing is located, 13 is the shaft, 39 is the packing, and 40 is the gland. The shaft 13 is provided with a groove 165 in which the packing is received and the lower edge of the groove is chamfered, as shown at 166. The packing 39 is of flexible, resilient material so that it can be slipped over the shaft, and is preferably formed with an annular groove therein having the shape, in cross section, shown at 167 in Fig. 16, although it may be a mere annular slot, as shown at 168 in Fig. 18, or, the packing ring may be solid, as shown in Fig. 17.

By using a groove or slot, the packing is expanded by the pressure of any liquid rising around the shaft and is forced into close contact with the top and side of the shaft groove to form a tight seal.

It is therefore to be understood that the words which I have used in describing my invention are words of description rather than of limitation, and that changes within the purview of the appended claims may be made without departing from the true scope and spirit of my invention.

What I claim is:

1. A fluid motor of the differential pressure type adapted for use as a closure operator comprising a body, a shaft mounted to oscillate therein, vanes connected to said shaft and disposed in two axially spaced pairs with the vanes in each pair symmetricaly disposed with respect to the axis of said shaft to form a balanced shaft-vane assembly; said body being provided with separate chambers for each vane within which said vanes are closely fitted but may oscillate with said shaft, and also with separate passages for conveying fluid under pressure to and from each of said chambers, respectively; said passages communicating with said chambers on opposite sides of the respective vanes therein; whereby the fluid pressure on one pair of said vanes will function, as a force couple, to turn said shaft in a direction opposite the force couple created by the fluid pressure on the other pair of said vanes; the combined areas of the vanes forming one of said pairs being substantially in excess of the combined areas of the vanes forming the other of said pairs; whereby with equal unit fluid pressure on all said vanes said shaft will turn in one direction.

2. A fluid motor of the differential pressure type comprising a body, a shaft mounted to oscillate in said body, a plurality of vanes laterally projecting from opposite sides of said shaft within said body and arranged in at least two pairs spaced axially of said shaft to provide a balanced rotor; said body being provided with a separate annular chamber for each of said vanes and within which the vane is closely fitted but may oscillate with said shaft, and also with separate passages for the flow of fluid under pressure to and from one of the chambers within which one of each pair of vanes is fitted; said shaft having a cross bore therethrough providing communication between the chambers for each pair of vanes, and said passages opening into said chambers on opposite sides of the respective vanes therein; whereby fluid under pressure entering said chambers will tend to move said pairs of vanes in opposite directions; and the sum of the products of the surface areas of one pair of vanes exposed to said fluid multiplied by the respective distances of their centers of gravity from the axis of said shaft being substantially in excess of the sum of the products of the areas of the other pair of vanes exposed to said fluid multiplied by the respective distances of their centers of gravity from said axis; whereby, with the same fluid pressure the turning moment exerted on said shaft by said fluid pressure on one of said pair of vanes will be substantially in excess of the turning moment exerted thereby on the other pair of said vanes.

FRED. K. van ALMELO.

REFERENCES CITED

The following references are of record in the file of this patent:

UNITED STATES PATENTS

| Number | Name | Date |
| --- | --- | --- |
| 280,974 | Venner | July 10, 1883 |
| 316,606 | Crist | Apr. 28, 1885 |
| 326,303 | Long | Sept. 15, 1885 |
| 444,087 | Chapleau | Jan. 6, 1891 |
| 521,603 | Crist | June 19, 1894 |
| 840,877 | Steedman | Jan. 8, 1907 |
| 976,972 | Yost | Nov. 29, 1910 |
| 1,051,054 | Anderson | Jan. 21, 1913 |
| 1,421,721 | Robinson | July 4, 1922 |
| 1,443,694 | McKechnie | Jan. 30, 1923 |
| 1,476,703 | Forman | Dec. 11, 1923 |
| 1,865,913 | Hynes | July 5, 1932 |
| 1,892,187 | Drennon | Dec. 27, 1932 |
| 2,141,953 | Hawes | Dec. 27, 1938 |
| 2,164,876 | Horlacher | July 4, 1939 |
| 2,203,913 | Logan | June 11, 1940 |
| 2,286,452 | Worth | June 16, 1942 |
| 2,350,066 | Parker | May 30, 1944 |

FOREIGN PATENTS

| Number | Country | Date |
| --- | --- | --- |
| 430,801 | Germany | June 25, 1926 |